United States Patent [19]

Guerra

[11] 3,949,440
[45] Apr. 13, 1976

[54] COMBINED TREE SAW, PRUNER AND PAINT SPRAYER

[75] Inventor: Delio A. Guerra, Alpine, N.J.

[73] Assignee: The Raymond Lee Organization, Inc., a part interest

[22] Filed: Jan. 6, 1975

[21] Appl. No.: 538,511

[52] U.S. Cl.................. 7/13 R; 30/123.3; 30/166 R
[51] Int. Cl.².................... B25F 1/02; B27B 23/00
[58] Field of Search................ 30/166, 123.3, 123.4; 7/13 R, 14.1 A; 47/1, 8

[56] References Cited
UNITED STATES PATENTS

| 379,359 | 3/1888 | Bosch | 30/166 X |
| 2,591,716 | 4/1952 | Murphy | 30/123.3 |

FOREIGN PATENTS OR APPLICATIONS

| 245,331 | 4/1912 | Germany | 30/123.3 |
| 8,954 | 1894 | United Kingdom | 30/166 |

*Primary Examiner*—Al Lawrence Smith
*Assistant Examiner*—Roscoe V. Parker

[57] ABSTRACT

An elongated handle supports a fixed pruner anvil and a saw attached thereto. A movable pruner blade is attached to the anvil and bears a movable pulley. A flexible cord passing over the movable pulley and a fixed pulley attached to the anvil can move the blade upwardly towards the anvil and thus cut tree limbs interposed between the blade and anvil. The handle also supports a pressurized aerosol can containing paint and propellant, the can having a conventional depressable nipple on its top which permits a jet of paint and propellant to be ejected from the can when deppresed. A solid vertically elongated rod is disposed above the nipple, with the top end of the tube being attached to the blade and moving downwardly towards the nipple as the blade moves upwardly towards the anvil. The tube depresses the nipple and thus causes a jet of paint to be sprayed. A spring presses the blade downwardly away from the anvil.

2 Claims, 2 Drawing Figures

COMBINED TREE SAW, PRUNER AND PAINT SPRAYER

SUMMARY OF THE INVENTION

The object of the invention is to provide a device that can saw off tree limbs and then spray paint upon the stumps created by the pruning process. The device can also be used for pruning. In this application the spray is not used since the branches cut are so small that painting is not required.

An elongated handle supports a fixed pruner anvil having a saw secured thereto for sawing branches.

A sprayer attached removably to the handle can then be used to paint the stub remaining. A primer blade can be removably secured to the anvil for pruning operations. The sprayer should then be detached or moved out of the way, since a spray operation is not needed.

DETAILED DESCRIPTION OF PREFERRED EMBODIMENTS

Figure 1:
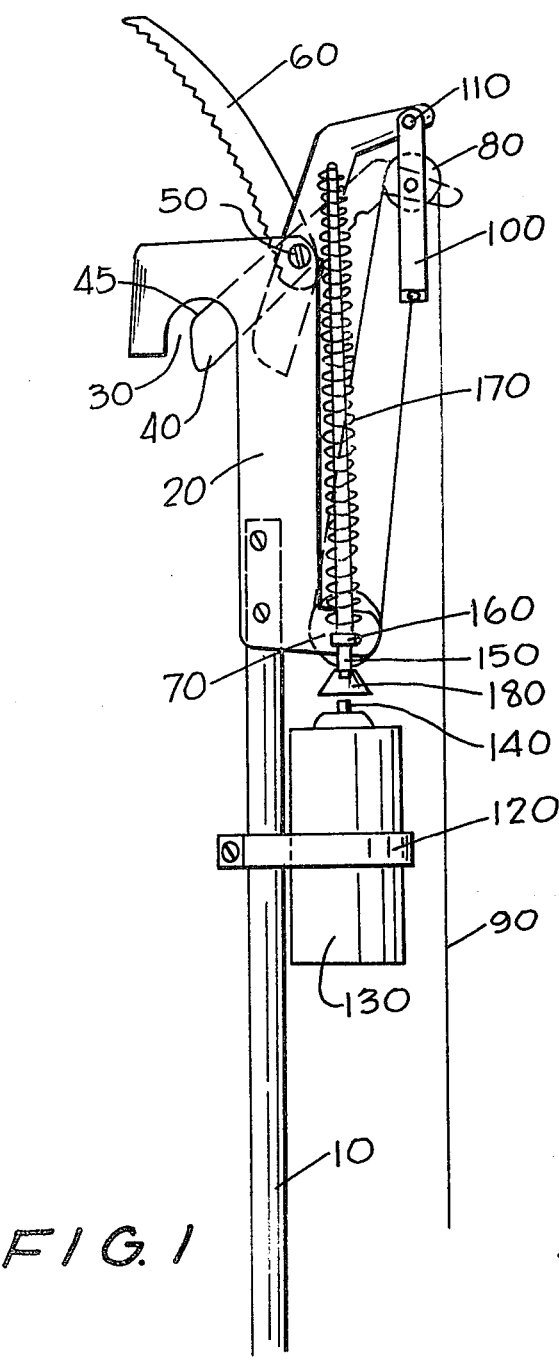
FIG. 1 shows a slide view of the invention.
Figure 2:
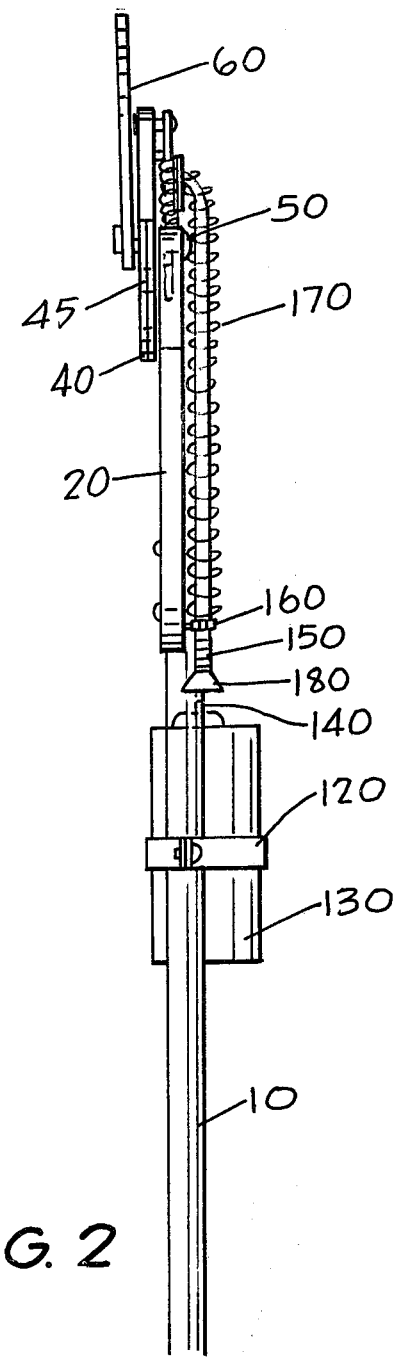
FIG. 2 shows a front view of the invention.

Referring now to FIGS. 1 and 2, a vertically elongated wooden handle 10 supports a fixed pruner anvil 20. The anvil has a generally semi-circular notch 30 into which a tree limb may be placed for pruning. A movable pruner blade 40 with sharp upper edge 45 is pivotally secured to the anvil by pivot screw 50, the screw 50 also serving to attach saw blade 60 to the anvil. To move the pruner blade clockwise in FIG. 1, and thus sever a tree limb interposed between the blade and the anvil, a fixed pulley 70 and a movable pulley 80 cooperate with an elongated flexible cord 90. The fixed pulley is attached to the anvil, while the movable pulley is attached to an elongated arm 100 which is pivotally secured at its upper end to the blade by pivot 110. The cord passes over both pulleys and is attached to the lower end of the arm, causing the sharp edge of the blade to move upwardly towards the anvil when the cord is pulled downwardly.

A circular clamp 120 encircles the handle and aerosol can 130, attaching the can to the handle. The can contains a pressurized suspension of paint and propellant, and bears a conventional depressable dispenser nipple 140 on its top surface.

A solid vertically elongated rod 150 is placed above the nipple, and is slidably attached to the anvil by annular collar 160, through which the tube passes. The rod extends upwardly and then sidewardly through a hole in the blade. Between the collar and the sidewardly curving portion of the blade is disposed a compression spring 170 which is wrapped around the rod. It may be seen that a clockwise movement of the blade will push the rod downwardly towards the nipple through the collar, and will also compress the spring. The length of the rod is such that the nipple will be depressed by the lower end of the rod, thereby initiating spraying, only after the blade has been rotated past the notch in the anvil. Thus, a downward pull on the cord will cause a jet of paint to be sprayed as viewed in FIG. 2. The lower end of the rod has a flared end 180 to prevent the escape of paint.

While the invention has been described with detailed reference to the drawings, the protection sought is to be limited only by the terms of the claims which follow.

I claim:
1. In combination:
   a vertically elongated handle;
   a fixed pruner anvil attached to the top of the handle;
   a fixed saw attached to the anvil;
   a movable pruner blade attached to the anvil in a manner that the upward movement of the pruner blade towards the anvil will cut a tree limb interposed between the blade and anvil;
   a vertically extending flexible cord;
   first means for moving the pruner blade upwardly towards the anvil in response to a downward pull upon the cord, the first means being characterized by a fixed pulley attached to the anvil and a movable pulley attached to the blade and moving therewith, the cord passing over both the pulleys; and
   second means for spraying paint in response to a downward pull upon the cord, said second means including:
   a pressurized vessel attached to the handle and containing a suspension of paint and propellant, the vessel having a conventional depressable dispenser nipple on its top which permits the ejection of a jet of paint and propellant when depressed; and
   a solid elontated vertically disposed rod slidably attached to the anvil and placed above the nipple, the lower end of the rod being attached to the blade and sliding downwardly towards the can as the blade moves upwardly towards the handle and depressing the nipple after the blade has reached the anvil and continues to be upwardly moved, causing paint and propellant to be sprayed.
2. The device of claim 1 further characterized by a compression spring wrapped around the rod to bias the rod away from the nipple.

* * * * *